Sept. 18, 1973 A. MÜLLER ET AL 3,759,750

SUPERCONDUCTIVE ALLOY AND METHOD FOR ITS PRODUCTION

Original Filed Nov. 28, 1969 3 Sheets-Sheet 1

SUPERCONDUCTIVE ALLOY AND METHOD FOR ITS PRODUCTION

Original Filed Nov. 28, 1969 3 Sheets-Sheet 2

United States Patent Office 3,759,750
Patented Sept. 18, 1973

3,759,750

SUPERCONDUCTIVE ALLOY AND METHOD FOR ITS PRODUCTION

Alfred Müller and Arno Fink, Erlangen, Germany, assignors to Siemens Aktiengesellschaft, Berlin and Munich, Germany Original application Nov. 26, 1969, Ser. No. 880,076, now Patent No. 3,679,401, dated July 25, 1972. Divided and this application Feb. 15, 1972, Ser. No. 226,614
Claims priority, application Germany, Nov. 30, 1968, P 18 11 926.1
Int. Cl. C22f *1/18*
U.S. Cl. 148—2 9 Claims

ABSTRACT OF THE DISCLOSURE

Intermetallic superconductor with composition $$V_xGa_yAl_z$$

where $x+y+z=100$ and $68\leq x\leq 87$; $5\leq y\leq 31$ and $$1\leq z\leq 22$$

Compositions can be formed in A2 lattice, machined to desired form and converted to A15 lattice.

This is a division, of application Ser. No. 880,076, filed Nov. 26, 1969, now U.S. Pat. 3,679,401, issued July 25, 1972.

Our invention relates to superconductive alloys and methods for their production.

Different intermetallic superconductive compounds having A15 crystalline structure are known. Some of the known compounds show excellent superconductive characteristics, especially high transition temperatures, and high critical magnetic fields. For instance, $Nb_3Sn$ has a transition temperature of about 18° K., while $V_3Ga$ has a transition temperature of about 14.5° K. The critical magnetic fields $H_{C2}$ for both compounds are at about 200 kilooersted. Opposed to these valuable qualities for the utilization of these compounds in the superconductive technique is the high brittleness of most of these compounds with A15 crystalline structure. Consequently, these compounds can barely be mechanically processed. Thus for instance it is not possible to form plastically compact bodies of $Nb_3Sn$, $V_3Ga$ or $V_3Si$. Also cutting machining can only difficultly be carried out. Therefore, these compounds have up to now been used in the superconductive technique mostly only in form of relatively thin layers or laminae applied on suitable carriers. For instance are known superconductive wires and strips where layers of $Nb_3Sn$ or $V_3Ga$ were produced by inserting a compound component into a carrier wire or tape consisting of the other compound component by diffusion, or by depositing both compound components from the gaseous phase, for example by reduction of the chlorides of the components with hydrogen onto a suitable metallic carrier. Superconductive wires or strips of such a kind have already been used successfully for winding of superconductive coils, for the generation of strong magnetic fields. The manufacture of massive bodies of intermetallic superconductive compounds with A15 crystalline structure, such as sheets or hollow cylinders suitable for instance for the shielding of magnetic fields and e.g. rings suitable as magnetic lenses, has its difficulties. It is possible to produce simple formed parts of superconductive compounds with A15 crystalline structure by pressing the powdered combination components, and subsequent sintering at high temperatures. But such sintered bodies are always porous and nonhomogeneous. Another disadvantage of the sintered bodies, made this way, is the considerable size alteration of the pressed articles during the sintering. These size alterations are especially deleterious, since the sintered articles, because of their brittleness, can only with difficulty be brought to the dimensions required for the particular use.

The object of this invention is to prepare a superconductive alloy, wherein the disadvantages concomitant in intermetallic compounds with a A15 crystalline structure are eliminated.

The superconductive alloy, according to this invention, is characterized in that it consists of the elements vanadium, gallium and aluminum and has at least partially an A15 crystalline structure. The composition corresponds to $V_xGa_yAl_z$ with $x+y+z=100$ and $68\leq x\leq 87$; $5\leq y\leq 31$ and $1\leq z\leq 22$ and lies in the ternary system vanadium-gallium-aluminum within the heptagon given by the points $V_{68}Ga_{31}Al_1$, $V_{68}Ga_{10}Al_{22}$, $V_{76}Ga_6Al_{18}$, $V_{80}Ga_5Al_{15}$, $$V_{84}Ga_6Al_{10},$$

$V_{87}Ga_3Al_5$, and $V_{87}Ga_{12}Al_1$.

The alloys of this invention are characterized in that it is possible to get them in a simple way as alloys with body centered cubic lattice of A2 type. In this form, they are relatively good mechanically machinable, so that they can be formed into the required shape for further utilization. Subsequently, the alloys can at least partially be transformed in the solid phase by tempering or annealing, at temperatures of more than 700° C., into a phase with A15 structure thereby possessing good superconductive properties. Furthermore, the alloys can be prepared by fusion in porefree form. This is especially significant for utilization of the alloys for magnetic leases in electron microscopes where the pores and inhomogeneities would be perceptible in distortion of the magnetic field, produced by a current flowing through the magnetic lens. That they are free of pores has a further advantage, as in tempering for the conversion of the A2 into A15 phase practically no volume changes of the alloys occur. Thus a mechanical reworking of the brittle A15 phase is obviated for the alloys of this invention. The invention shall be explained in detail further with respect to the drawing in which:

FIG. 2 shows the concentration diagram of FIG. 1, with some specific alloys drawn in;

Figures 4, 5:
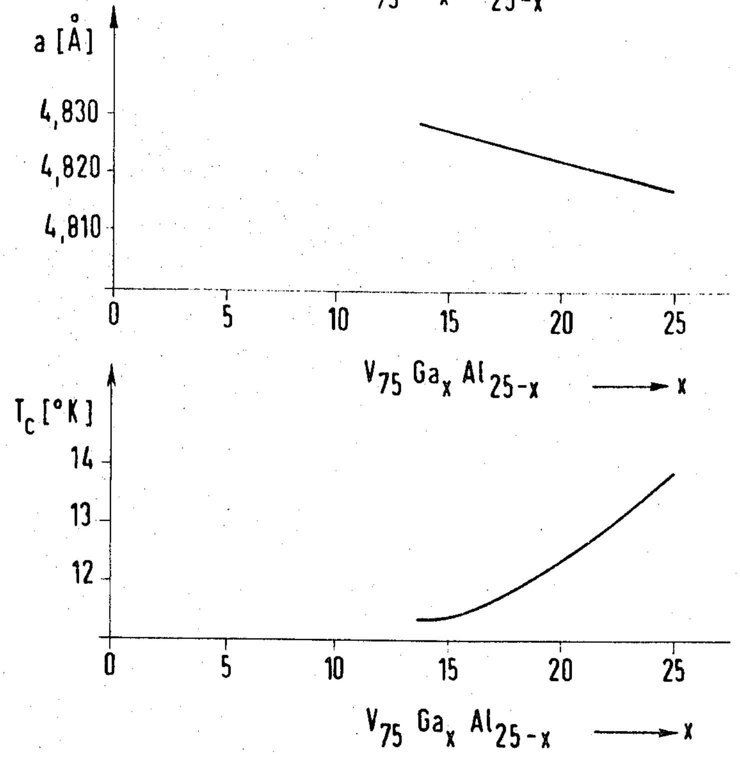
FIG. 4 shows the dependence of the lattice constant.

FIG. 5 the dependence of the transition temperatures of alloys of the structure $V_{75}Ga_xAl_{25-x}$ on the composition of the alloy.

Figure 1:
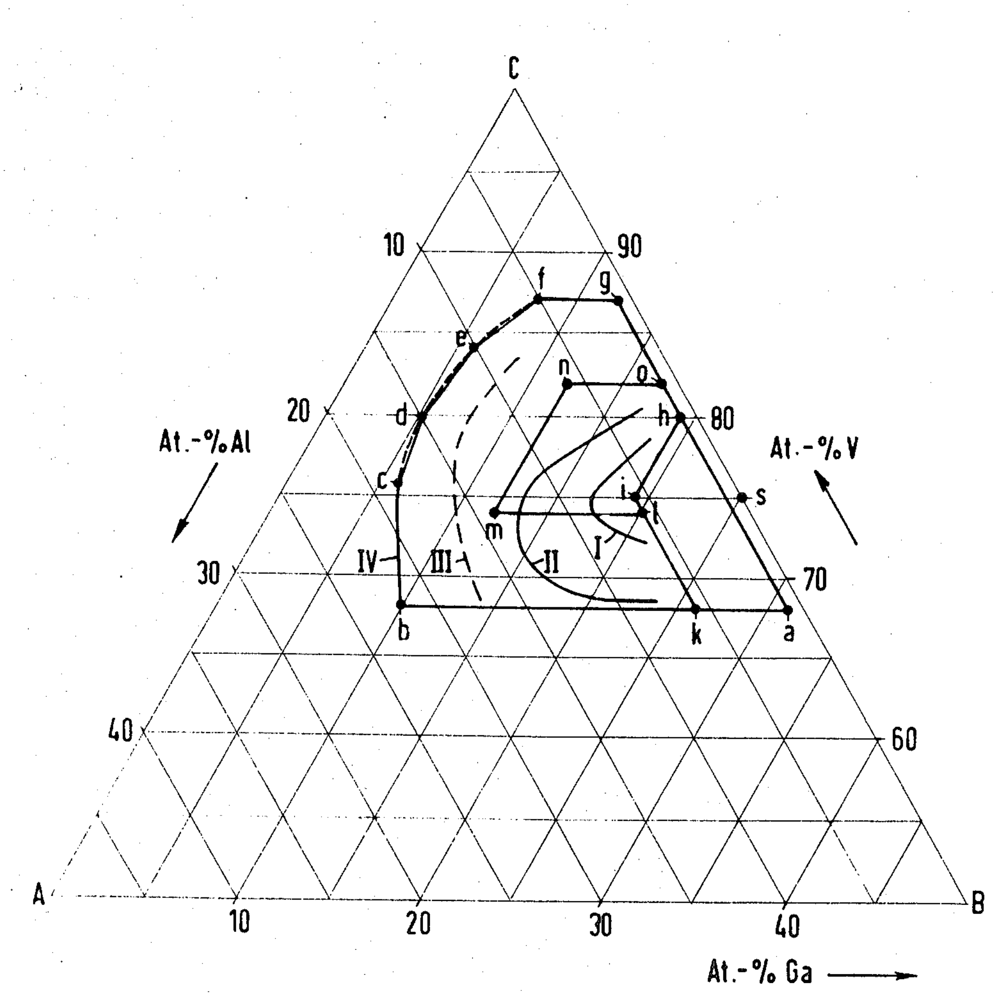
FIG. 1 shows the concentration diagram of the ternary system vanadium-gallium-aluminum containing the superconductive alloys according to the invention.

FIG. 1 shows a concentration triangle of the ternary system vanadium-aluminum-gallium. The alloys of the invention are situated within the heptagon given by the points *a, b, c, d, e, f* and *g*. The corner point A of the concentration triangle corresponds to an alloy of 50% vanadium and 50% aluminum, corner point B to an alloy of 50% vanadium and 50% gallium, and corner point C to pure vanadium. All percentages herein, unless otherwise specified, are atom percent. The alloys within the concentration triangle contain therefore between 50 and 100% vanadium, 0 and 50% gallium, and 0 and 50% aluminum. The heptagon given by the points *a* to *g* is in the zone occupied by the alloys of the structure $V_xGa_yAl_z$ with $x+y+z=100$ and $68\leq x\leq 87$; $5\leq y\leq 31$ and $1\leq z\leq 22$. The point "*a*" corresponds to an alloy of the composition $V_{68}Ga_{31}Al_1$, the point *b* to an alloy of the composition $V_{68}Ga_{10}Al_{22}$, the point *c* to an alloy of the composition $V_{76}Ga_6Al_{18}$, the point *d* to an alloy of the composition $V_{80}Ga_5Al_{15}$, the point *e* to an alloy of the composition $V_{84}Ga_6Al_{10}$, the point *f* to an alloy of the composition $V_{87}Ga_8Al_5$ and the point *g* to an alloy of the composition $V_{87}Ga_{12}Al_1$.

The alloys situated within the heptagon given by the points *a* to *g* show astonishing advantages compared to the known compounds with A15 crystalline structure, especially compared to one in the binary system vanadium-gallium with a phase range of about 20 to 35% gallium superconductive compound $V_3Ga$ (point *s* in FIG. 1) which is explained as follows: The compound $V_3Ga$ with an A15 crystalline structure is formed in the binary system vanadium-gallium by transformation in the solid phase at cooling down of a vanadium-gallium alloy of corresponding composition with body centered cubic lattice of the A2 type. The temperature at which the alloy of stoichiometrical composition is transformed on cooling to a compound of A15 structure is about 1300° C. At higher temperature, only the A2 type vanadium-gallium mixed crystal is stable. This crystal is metastable at room temperature and is not superconductive with a gallium content of 20 to 35% even at lowest temperatures. The velocity, at which the transformation of the A2 phase into the A15 phase occurs, is very great. To obtain $V_3Ga$ at room temperature with a body centered cubic lattice requires intensive quenching of the alloys from a temperature of more than 1300° C. This occurs if, for instance, the alloy is thrown directly from the oven into an ice water mixture. In smaller samples, with a weight up to about 10 g., numerous cracks occur as a rule. Thus the specimens are unfit for further processing. Larger alloy samples are, by this quenching, at least partially transformed, so that a mixture of two phases of A2 and A15 structure forms. Because of the A15 phase, these alloys are so brittle that they cannot be satisfactorily mechanically machined. For a compound $V_3Ga$ it is therefore practically impossible to produce first an alloy with a structure A2, and then to bring it by mechanical treatment to the required form, and subsequently to transform it into the superconductive compound with A15 structure.

The ternary system vanadium-gallium-aluminum also exists with an A15 phase space, which at decreasing temperature, starting from the side of the concentration diagram opposite to point A in FIG. 1, extends increasingly into the interior of the concentration triangle. The boundary of the A15 phase region, which extends from the binary system V–Ga into the concentration triangle at a temperature of 1000° C., is given in FIG. 1 by the line I, the boundary of the A15 phase region at a temperature of 800° C. is represented by the line II. The broken line III denotes the boundary of the A2 phase region, which extends from the binary system V–Al into the concentration triangle at a temperature of 1000° C., and the broken line IV the boundary of the A2 phase region at a temperature of 800° C. At high temperatures, the alloys exist within the heptagon given by points *a* to *g* as mixed crystals or solid solutions of the A2 type. Upon cooling down, in solid phase, they are at least partially transformed into alloys of A15 structure. Surprisingly, however, the velocity of the conversion of A2 into A15 phase, as well as the temperatures at which the conversion starts when cooling, is considerably smaller than in the binary system V–Ga.

The alloys therefore can be cooled considerably more slowly from high temperatures to room temperature than the alloys in the binary system V–Ga, without conversion into the brittle form with A15 structure or without troublesome cracks occurring in the samples. The so obtained alloys of A2 type are metastable at room temperature, have relatively high hardness, but nevertheless can be well mechanically worked and brought into a required form for further use. By subsequent tempering, at temperatures between about 700° C. and the temperature where the conversion of the A2 phase into the A15 phase starts, the alloys can at least be partially transformed into the superconductive phase with A15 structure. Alloys, whose composition is within the concentration triangle between the boundary lines of the appropriate temperature, thus for instance between the lines II and IV at 800° C., respectively, I and III at 1000° C., represent after tempering a mixture of the A2 and A15 phase. The remaining, not superconductive, A2 phase has no considerable disadvantageous effects on the superconductive properties of the alloys. Alloys which are lying between the straight line connecting points "*a*" and "*g*" and the lines I or II are transformed completely at tempering at 1000° C., respectively 800° C., into the superconductive A15 phase.

The A2 phase has, as already mentioned, a body centered cubic lattice, in which the vanadium-gallium and aluminum atoms with all probability are statistically distributed at the lattice points.

The crystal lattice of the A15 phase, which is also known under the designation $Cr_3Si$ phase and $\beta$ tungsten phase, is for instance described in a paper by Geller in the Journal "Acta Crystallographica" 9 (1956), at pages 885 to 889. It corresponds to the composition $A_3B$, whereby the A atoms occupy the lattice sites (¼, 0, ½), (½, ¼, 0), (0, ½, ¼), (¾, 0, ½), (½, ¾, 0) and (0, ½, ¾) and the B atoms the lattice sites (*o, o, o*) and (½, ½, ½). In the ternary system vanadium-gallium-aluminum with a 75% vanadium content, the vanadium atoms, with all probability, occupy the A sites, and the aluminum atoms, the B sites. If the alloy contains less than 75% vanadium, with great probability, the free A sites are filled by the surplus aluminum and gallium atoms. If the alloy contains more than 75% vanadium, the surplus vanadium atoms, with great probability, fill the B sites not occupied by gallium or aluminum atoms. With the aid of the X-ray diagrams of the powdered alloy the presence of the A15 structure is unobjectably ascertainable.

Especially slow is the conversion of the A2 into the A15 phase in alloys whose composition in the concentration triangle is within the nonagon with the points $V_{63}Ga_{26}Al_6$, $V_{68}Ga_{10}Al_{22}$, $V_{76}Ga_6Al_{18}$, $V_{80}Ga_5Al_{15}$, $V_{84}Ga_6Al_{10}$, $V_{87}Ga_8Al_5$, $V_{87}Ga_{12}Al_1$, $V_{80}Ga_{19}Al_1$ and $V_{75}Ga_{19}Al_6$, which is designated in FIG. 1 by the points *k, b, c, d, e, f, g, h* and *i*. For these alloys, the cooling down from high temperature can take place especially slowly, without a conversion into the brittle A15 phase. Because of the especially simple preparation these alloys are particularly advantageous.

Of the alloys within the nonagon given by the points *k, b, c, d, e, f, g, h* and *i*, those with $x \geq 74$ which are in FIG. 1 within the hexagon given by the points *h, i, l, m, n* and *o* which correspond to the compositions $V_{80}Ga_{19}Al_1$, $V_{75}Ga_{19}Al_6$, $V_{74}Ga_{20}Al_6$, $V_{74}Ga_{12}Al_{14}$, $V_{82}Ga_{12}Al_6$ and $V_{82}Ga_{17}Al_1$, are particularly distinguished by high current density. These alloys are especially advantageous for utilization where high critical current densities of the superconductive material are necessary, for instance cylinders for shielding of magnetic fields.

The usual contaminations, such as traces of heavy metals, oxygen, nitrogen, boron and carbon, have no considerable effect on the superconductive properties of the alloys in accordance with this invention. Oxygen retards, carbon promotes the conversion from the A2 into the A15 phase on cooling down from high temperature to room temperature only to a slight degree. By "traces" are considered impurity constituents in the total amount of up to about 0.75%. By admixture of boron or carbon in amounts between about 1 and 10%, on the other hand, a considerable increase of the critical current densities of the alloys may be obtained. Alloys which contain supplementary 1 to 10% boron or carbon are therefore especially advantageous for uses where very high critical current densities are desired.

Alloys according to the invention are profitably prepared in that way, that at first the starting materials are melted together. The alloy so obtained is then cooled down to room temperature so fast that no conversion of the A2 phase into the A15 phase takes place. Subsequently, the so obtained bodies are processed into a desired form, and then tempered at a temperature between 700° C. and that temperature where conversion of the A2 phase into the A15 phase starts, at least until the complete conversion into the A15 phase, or equilibrium between A2 and A15 phase, is attained. It can further be favorable to insert an additional procedure step, and allow the alloy obtained by fusing of the starting materials to solidify nondirectionally; then annealing with the purpose of homogenization at a temperature above the temperature at which conversion of the A2 phase into A15 phase starts, but below the melting temperature, and subsequently cooling down the alloy from the annealing temperature to room temperature in a way so that no conversion of the A2 phase into A15 phase takes place.

The melting, annealing and tempering are advantageously made in an inert gas atmosphere, for instance argon.

At melting together the starting elements, care should be taken that not too great losses of gallium and aluminum occur by evaporation of these elements. Also to be avoided is a gravity segregation by sedimentation of heavier alloy components in the fused mass. If the fusing of the elements is made for instance by inductive heating in a water cooled copper crucible, it is expedient to heat the starting elements repeatedly temporary, e.g. for 20 seconds, to about 2000° C. and between the individual heatings, by disconnection of the heating, to allow to solidify nondirectionally. If, on the contrary, the fusing of the elements takes place by inductive heating in an uncooled aluminum oxide crucible, whose depth is great in relation to its diameter, there is hardly the possibility of an evaporation of aluminum and gallium or a gravity segregation. The melting can be made in one operation, for instance by heating for 10 minutes to about 2000° C. Subsequently the alloy can be allowed to solidify nondirectionally, by cooling of the crucible or by pouring into a cooled form.

To compensate for the unavoidable losses of aluminum and gallium by evaporation from the smelt, it is appropriate to add a surplus of these elements. The necessary amount can be found in a simple way by tests.

The temperature at which the conversion of the A2 phase into the A15 phase begins, depends on the composition of the alloy and lies between 800 and close to 1300° C. For the purpose of homogenizing it was found favorable for the alloy which solidifies at first nondirectionally from the smelt, to anneal at a temperature of about 1400° C. for 20 minutes. This annealing can, e.g., take place by inductive heating.

Also the rate of conversion of the A2 into the A15 phase on cooling of the alloys after smelting or homogenization depends on the composition of the alloys. For the alloys which are situated in the concentration triangle according to FIG. 1, within the nonagon given by the points *b, c, d, e, f, g, h, i,* and *k,* the conversion is so slow that the cooling down from the melting or annealing temperature to room temperature can occur at a rate of about 1° to 10° per second, without a conversion of the A2 phase into the A15 phase taking place. It is appropriate to cool more rapidly the alloys within the quadrangle given by the points *a, k, i* and *h,* to avoid certainly a conversion of the A2 phase into the A15 phase. The cooling can take place the usual way, by disconnecting of the heating or by blowing, onto the alloy, a cold inert gas, e.g. argon, or by immersion of the alloy into a cooling liquid e.g. oil or water.

The tempering of the alloy for conversion of the A2 into the A15 phase takes place at a temperature between about 700° C. and that temperature at which, on cooling from a very high temperature, the conversion of the A2 phase into the A15 phase starts. Below 600° C., practically no determinable conversion of the A2 into the A15 phase takes place. By choice of the suitable tempering temperatures in dependence on the composition of the alloy, the phase composition of the final product can be affected. For instance, it is possible to transform alloys situated in FIG. 1 between the curve I and the straight line between the points *a* and *g,* with tempering at 1000° C. completely into the A15 phase, whereas alloys lying between the curves I and II, on tempering at 1000° C. give a mixture of A2 and A15 phase. However, these alloys also turn completely into A15 phase on tempering at about 800° C., whereas alloys lying between the curves II and IV can only be converted into a mixture of the A2 and A15 phase. With suitable selection of the composition of the alloy and the tempering temperature, the alloy can be adapted for the different purposes of application. If a great cross section of the superconductive material is required, it is advantageous to use alloys and tempering temperatures where a complete conversion into the A15 phase occurs. On the other hand, for alloys constituting a mixture of the A2 and A15 phase, higher mechanical resistibility, that is less brittleness, is expected. If high critical current density is desired, the tempering procedure should not continue substantially beyond the complete conversion of the alloy into the A15 phase, or beyond attaining the equilibrium between the A2 and A15 phase, since further tempering may cause healing of lattice defects, thus reducing the critical current densities. At tempering temperatures of 800° C. and above, the conversion of the A2 into the A15 phase has after at the most 20 hours progressed to an equilibrium between A2 and A15, or to the complete conversion into the A15 phase.

The tempering therefore should advantageously be made at a temperature between about 800 and 1000° C., and should continue for at least about 20 hours. The tempering procedure may be especially carried out in a way that the alloy after tempering at about 800° C. is heated for 1 to 3 hours at about 1000° C. Alloys treated in this way showed practically no flux jumps at bringing into a magnetic field, that is the magnetic field penetration into the body consisting of thee alloy at increasing of the outer field, was not irregular but continuous. The tempering can favorably be made in an electrically heated oven, wherein the alloy to be tempered is placed in an open or closed quartz tube in an inert gas atmosphere e.g. argon. Vacuum or reducing atmosphere should be avoided to avoid incorporation of silicon contamination from the quartz tube into the alloy and the formation of $V_3$ Si. The article to be tempered can, for protection against contamination, be wrapped in a molybdenum foil.

The cooling of the tempered article after tempering at 800° C. can take place in the air. After tempering at higher temperatures, it is recommended to put the article into a cooling liquid to cool it down more rapidly.

The invention shall be further described by the following examples.

EXAMPLE 1

An alloy of the composition $V_{80.5}Ga_{17.0}Al_{2.5}$ was prepared by placing 8.0399 g. vanadium of a purity of more than 99.5%, 2.5656 g. gallium of a purity of 99.99% and 0.1457 g. aluminum of a purity of 99.99%, in coarse grained form, into a water cooled copper crucible. The materials were, in an argon atmosphere, by high frequency inductive heating, melted at about 2000° C. for about 20 seconds. By means of disconnecting the heating, the smelt was allowed to solidify nondirectionally. The regulus thus obtained was subsequently for the purpose of complete mixing of the elements, melted in the copper crucible 5 times, each time for 20 seconds at about 2000° C. The weights of elements in the copper crucible described correspond to a composition of $V_{78.9}Ga_{18.4}Al_{2.7}$.

Thus an excess of 1.4% gallium and 0.2% aluminum was added to compensate the evaporation losses during melting and 5 times remelting.

After the last remelting, the regulus was put on an aluminum oxide substrate for homogenization, and was annealed for 20 minutes by inductive heating at a temperature of about 1400° C. The regulus was cooled down from this annealing temperature to room temperature within about 5 minutes, that is at a cooling rate of about 5° per second. An alloy of the composition $V_{80.5}Ga_{17.0}Al_{2.5}$ with A2 structure was thus obtained.

A cylindrical article with a central bore hole along the axis of the cylinder was machined from this alloy. For the conversion of the A2 into the A15 phase, the article then was tempered for about 24 hours at a temperature of about 800° C. For this purpose, it was placed in a quartz ampule and heated in a resistance tubular heating oven in an argon atmosphere. The article, after tempering, was cooled in air.

The article had a transition temperature $T_c$ of about 8.1° K. with a span of the temperature interval, in which the transition from the normal conduction to the superconductive phase takes place, of about $\Delta T_c$=0.9°. The article showed the following critical current densities $j_c$ in dependence on an external magnetic field H parallel to the cylinder axis:

| H [kG] | 10 | 20 | 30 |
|---|---|---|---|
| $j_c$ [$10^3$ A/cm²] | 50 | 22 | 9 |

After retempering for about 166 hours at about 800° C., the critical current density dependent on the magnetic field decreased to the following values:

| H[kG] | 10 | 20 | 30 |
|---|---|---|---|
| $j_c$ [$10^3$ A/cm²] | 13 | 5.1 | 3 |

The declining of the critical current density is with all probability traceable to healing of the lattice distortions, and thereby a decrease of the so-called "pinning centers." If a high critical current density is required, the tempering process therefore should not be considerably extended over more than one day.

EXAMPLE 2

An alloy of the composition $V_{78}Ga_{14.5}Al_{7.5}$ was prepared by weighing in 7.7852 g. vanadium, 2.2170 g. gallium and 0.4154 g. aluminum in the purity of Example 1, in coarse grained form, into a copper crucible. The amounts of the starting materials correspond to a composition of $V_{76.4}Ga_{15.9}Al_{7.7}$. Here also for equalization of evaporation losses an excess of 1.4% of gallium and 0.2% of aluminum was weighed in. The further preparation of the alloy was as in Example 1. The final alloy had a composition $V_{78}Ga_{14.5}Al_{7.5}$ and a transition temperature $T_c$ of about 10.9° K., with $\Delta T_c$=1.6°. After the first tempering for about 24 hours at about 800° C. a cylindrical article made from the alloy showed the following critical current densities in dependence on the external magnetic field H:

| H[kG] | 10 | 20 | 30 |
|---|---|---|---|
| $j_c$ [$10^3$ A/cm²] | 52 | 30 | 20 |

After retempering for about 166 hours at about 800° C., the critical current density decreased to the following values:

| H [kG] | 10 | 20 | 30 | 40 | 50 |
|---|---|---|---|---|---|
| $j_c$ [$10^3$ A/cm²] | 37 | 19 | 13 | 9 | 7 |

EXAMPLE 3

An alloy of the composition $V_{75}Ga_{13.5}Al_{11.5}$ was prepared by weighing 7.4794 g. vanadium, 2.0776 g. gallium and 0.6312 g. aluminum in coarse grained form, of a purity as in Example 1, into a copper crucible. In this case, too, compared with the required final alloy composition, an excess of 1.4% gallium and 0.2% aluminum was weighed in. The further preparation of the alloy took place as in Example 1. The final alloy had a transition temperature $T_d$ of about 11.6° K. with $\Delta T_c$=0.2°. After tempering for 24 hours at about 800° C., a cylinder made from this alloy showed the following current densities, in dependence on the external magnetic field:

| H [kG] | 10 | 20 | 30 | 40 | 50 |
|---|---|---|---|---|---|
| $j_c$ [$10^3$ A/cm²] | 62 | 33 | 23 | 17 | 10 |

After further tempering for about 166 hours at about 800° C., the critical current densities decreased to the following values:

| H [kG] | 10 | 20 | 30 | 40 | 50 |
|---|---|---|---|---|---|
| $j_c$ [$10^3$ A/cm²] | 48 | 26 | 18 | 13 | 10 |

With a subsequent heating to 1000° C., after the tempering at 800° C., the critical current densities were not changed. The article treated this way distinguished itself by complete absence of flux jumps.

EXAMPLE 4

An alloy of the composition $V_{71.0}Ga_{15.5}Al_{13.5}$ was prepared by weighing in 7.0718 g. vanadium, 2.3566 g. gallium and 0.7392 g. aluminum, of the purity of Example 1, in coarse grained form, into a copper crucible. Compared to the final alloy composition, an excess of 1.4% gallium and 0.2% aluminum was also added. The further preparation was made in accordance with Example 1. The cylindrical article produced by mechanical treatment was tempered for about 190 hours at 800° C. It showed a transition temperature $T_c$ of about 8.2° K. and the following critical current densities in dependence on an external magnetic field:

| H [kG] | 10 | 20 | 30 | 40 | 50 |
|---|---|---|---|---|---|
| $j_c$ [$10^3$ A/cm²] | 3 | 2.5 | 1.9 | 1.6 | 1.3 |

In this example it is seen that alloys with less than 74% vanadium show considerably lower critical current densities than alloys with a higher vanadium content. Furthermore, the cylindrical article showed no sort of flux jumps.

A large number of additional alloys were prepared according to the procedure described in Example 1. The tempering conditions compared with Example 1 varied. A part of the alloys were tempered as well at 1000° C. as at 800° C. for total or partial conversion from the A2 into the A15 phase. The alloys so obtained and some of their properties are compiled in the following table. Column 1 of the tablet lists the consecutive number of the alloy; column 2 lists the composition of the alloy according to the chemical analysis; column 3 lists the temperature and the duration of the thermal treatment; column 4 lists the number of phases present in the alloy after tempering. The single phase material consists completely of A15 phase, and the two-phased material of a mixture between A2 and A15 phase. Column 5 of the table lists the lattice constant of the portion with A15 structure in angstrom units; column 6 lists the transition temperature $T_c$ in ° K. and column 7 lists the transition width $\Delta T_c$ in ° K.

TABLE

| 1 | 2 | 3 | 4 | 5 | 6 | 7 |
|---|---|---|---|---|---|---|
| 5 | $V_{74,5}Ga_{22,8}Al_{2,7}$ | $20^h$/1,000° C | 1 | ---------- | 13.0 | 0.1 |
| | | $14^d$/800° C | 1 | 4.8185 | 13.3 | 0.2 |
| 6 | $V_{73,7}Ga_{21,3}Al_{5,0}$ | $20^h$/1,000° C | 1 | ---------- | 12.3 | 0.2 |
| | | $14^d$/800° C | 1 | 4.822 | 12.6 | 0.2 |
| 7 | $V_{74,1}Ga_{19,6}Al_{6,3}$ | $20^h$/1,000° C | 1 | ---------- | 12.0 | 0.5 |
| | | $14^d$/800° C | 1 | 4.824 | 12.2 | 0.3 |
| 8 | $V_{74,1}Ga_{15,2}Al_{10,7}$ | $20^h$/1,000° C | 2 | 4.825 | 11.6 | 0.4 |
| | | $14^d$/800° C | 1 | 4.8275 | 11.4 | 0.3 |
| 9 | $V_{74,7}Ga_{13,1}Al_{12,2}$ | $20^h$/800° C | 2 | 4.8295 | 11.7 | 0.3 |
| 10 | $V_{76,7}Ga_{8,6}Al_{14,7}$ | $210^h$/800° C | 2 | 4.828 | 12.1 | 0.2 |
| 11 | $V_{78,4}Ga_{17,2}Al_{4,4}$ | $20^h$/1,000° C | 2 | 4.8175 | 9.3 | 0.4 |
| | | $14^d$/800° C | 1 | 4.8185 | 9.4 | 0.8 |
| 12 | $V_{76,7}Ga_{18,0}Al_{5,3}$ | $20^h$/1,000° C | 1 | ---------- | 11.2 | 0.7 |
| | | $14^d$/800° C | 1 | 4.8210 | 11.5 | 0.2 |
| 13 | $V_{72,5}Ga_{20,3}Al_{7,2}$ | $20^3$/1,000° C | 2 | ---------- | 10.6 | 2.2 |
| | | $14^d$/800° C | 1 | 4.8265 | 12.3 | 0.3 |
| 14 | $V_{68,3}Ga_{22,0}Al_{9,7}$ | $14^d$/800° C | 1 | 4.8355 | 9.4 | 0.6 |
| 15 | $V_{78,3}Ga_{13,8}Al_{7,9}$ | $20^h$/800° C | 2 | 4.8225 | 10.2 | 0.9 |
| 16 | $V_{70,9}Ga_{15,1}Al_{14,0}$ | $20^h$/800° C | 2 | ---------- | 9.0 | 1.5 |

Figure 2:
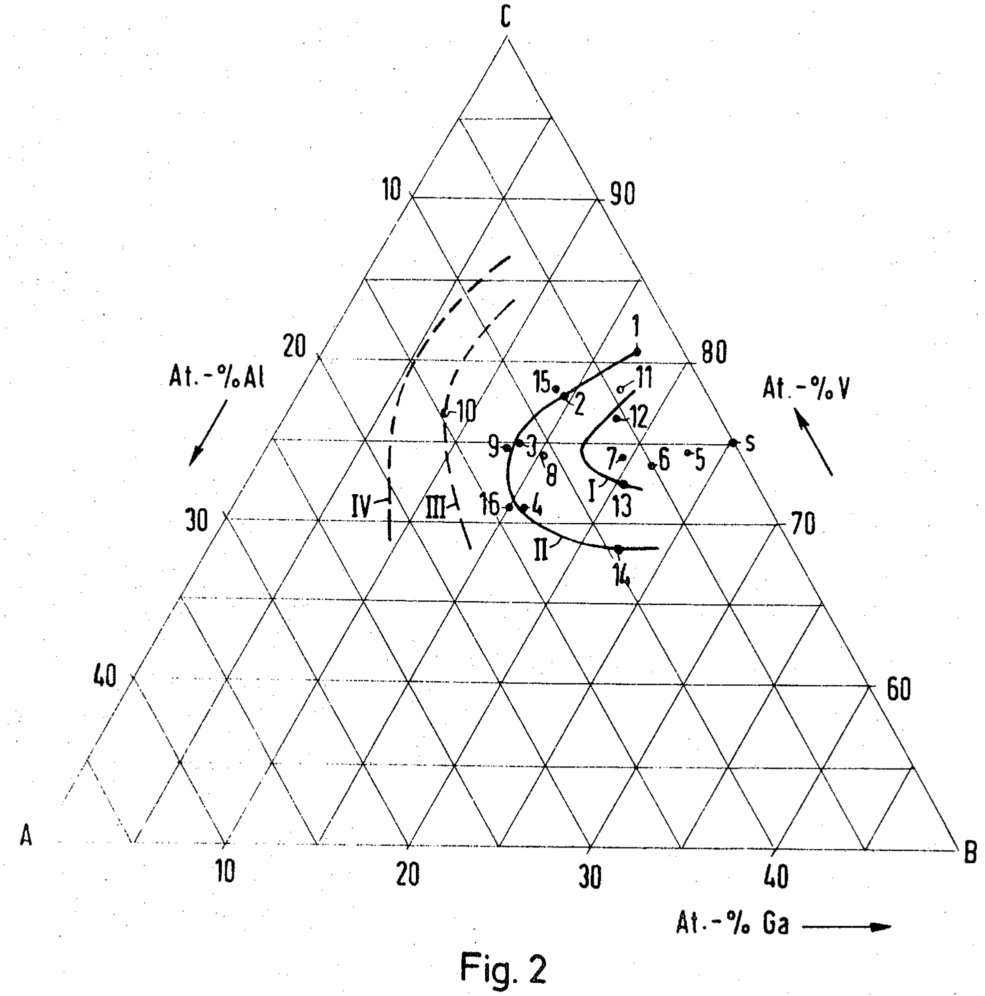

In FIG. 2, the position of these alloys, as well as the position of the alloys specified in Examples 1 to 4, within the concentration diagram of the ternary system vanadium-gallium-aluminum, is represented. The points corresponding with the individual alloys are indicated with the consecutive numbers 1 to 16. The boundaries of the A15 or A2 phase fields at 800° or 1000° C. are presented in FIG. 1 by solid or dotted lines.

Figure 3:
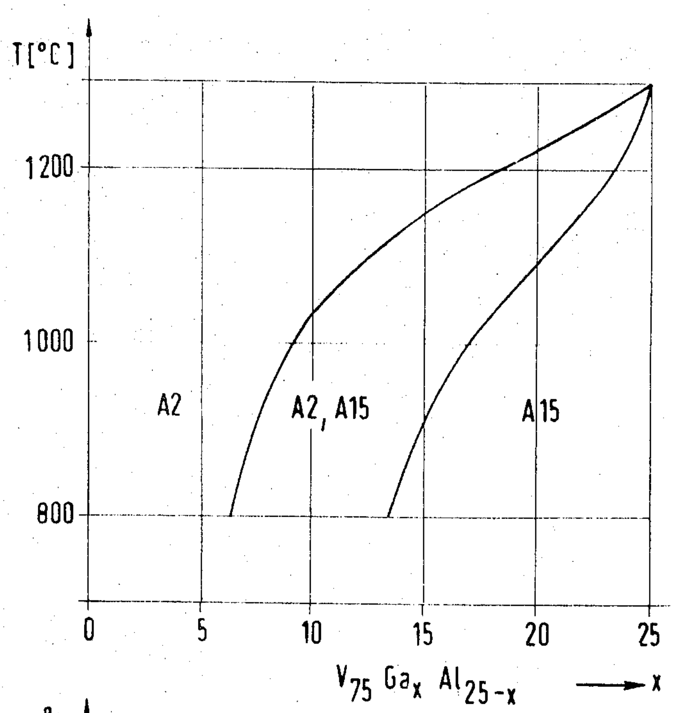
FIG. 3 shows the extent of the A2 and A15 phase range for alloys of the structure $V_{75}Ga_xAl_{25-x}$, with $0\leq x\leq 25$ in dependence of temperature and composition of the alloy.

FIG. 3 shows an intersection vertical to the concentration triangle in the concentration-temperature diagram along the straight line in the concentration triangle, where the alloys of the composition $V_{75}Ga_xAl_{25-x}$ with $0 \leq x \leq 25$ are situated. The abscissa shows the composition of the alloy, while the ordinate shows the temperature in 0° C. Close to the intersection are the alloys with the numbers 3, 5, 7, 8 and 9 in FIG. 2. In FIG. 3 it is seen that the A15 phase space increases with decreasing temperature, whereas the A2 phase space decreases with decreasing temperature. At the temperature, corresponding to the line of demarcation between A2 phase space and the A2–A15 phase space, the conversion starts for the respective alloy from the A2 into the A15 phase.

FIG. 4 illustrates the dependence of the lattice constants of the A15 phase, and FIG. 5 illustrates the dependence of the transition temperature for alloys of the composition $V_{75}Ga_xAl_{25-x}$ with A15 structure on the alloy composition. Both figures apply to alloys which were tempered at 800° C. The ordinate of FIG. 4 is the lattice constant in angstrom units, while the ordinate of FIG. 5 is the transition temperature $T_c$ in K°. The abscissa of both figures is the alloy composition. The examples in FIGS. 2 to 5 show that the transition temperatures of the alloys with A15 structure decrease slightly with increasing distance from point *s* in the concentration diagram, which corresponds to the intermetallic compound $V_3Ga$. The least decrease of the transition temperature is observed in alloys whose composition corresponds with the structural formula $V_{75}Ga_xAl_{25-x}$. At the margin of the A15 phase field in the isothermal intersection at 800° C., that is along the line II in FIG. 2, transition temperature of about 9 to 12° K. were measured. The lattice constants of alloys with A15 structure increase along the $V_{75}$ line. For deviations from this line to higher vanadium content, the lattice constants decrease, whereas they increase for deviations to smaller vanadium content. With increasing aluminum content, the lattice constants increase.

Before conversion into the A15 phase, the alloys which are metastable at room temperature and have an A2 crystal structure show a relatively great hardness. This seems to depend essentially on the gallium content of the alloys, and increases with the same. For alloys with 0 to 15% gallium, Vickers hardness of 300 to 400 kg./cm.$^2$ for test loads of 500 pounds, was measured. For a gallium content of 20 or more percent, hardness coefficients of 500 to 600 kg./mm.$^2$ were attained. Contamination of the specimens with nitrogen, oxygen, boron or carbon results in an additional increase of the hardness. Nevertheless the alloys with A2 structure are not brittle, so that they can relatively well be mechanically worked, in contrast to alloys with A15 structure.

The following two examples illustrate the possibility of increasing the critical current densities of the alloys by addition of about 1 to 10% boron or carbon.

EXAMPLE 5

A carbon containing alloy was prepared by weighing in 7.4182 g. vanadium, 1.8266 g. gallium, 0.5990 g. aluminum, of a purity as mentioned in Example 1, and 0.0720 g. carbon in coarse grained form, into a copper crucible. The weighed portion corresponds to the composition $V_{72.8}Ga_{13.1}Al_{11.1}C_3$. The elements were fused to an alloy, as in Example 1. Also the homogenization and cooling of the regulus obtained on fusing, was according to Example 1. The regulus was thereafter machined into a hollow cylinder which was tempered for 24 hours at about 800° C. After tempering, the article was composed of a two phased material, whose matrix has an A15 structure and contains vanadium-carbon inclusions. The latter in all probability were in the form of $V_2C$. With this assumption and consideration of the evaporation losses, the final alloy had the composition $$V_{75}Ga_{13}Al_{12}+0.09$$

$V_2C$. The transition temperature $T_c$ was about 11.7° C. with $\Delta T_c=0.15°$. In dependence upon an external magnetic field H, the cylinder showed the following critical current densities:

| H[kG] | 10 | 20 | 30 |
|---|---|---|---|
| $j_c$[$10^3$A/cm$^2$ | 67 | 40 | 29 |

After retempering for 166 hours at about 800° C., the critical current density only scarcely decreased, whereas the cylinder did not show flux jumps. After the second retempering, the critical current density in dependence on the external magnetic field H was:

| H[kG] | 10 | 20 | 30 | 40 | 50 |
|---|---|---|---|---|---|
| $j_c$[$10^3$A/cm$^2$] | 67 | 36 | 25 | 18.5 | 14.7 |

EXAMPLE 6

A boron containing alloy was prepared by weighing in 7.4182 g. vanadium, 1.8266 g. gallium and 0.5990 g. aluminum of the purity as in Example 1 and 0.0650 g. boron in coarse grained form, into a copper crucible. The weighed portion corresponds to the composition $$V_{72.8}Ga_{13.1}Al_{11.1}B_3$$

The further procedure was made as specified in Example 5. After tempering, for 24 hours at about 800° C., a hollow cylinder of a two phased alloy was obtained, whose matrix has an A15 structure, and contains vanadium-boron inclusions probably with the composition $V_3B_2$. With consideration of the evaporation losses, the final alloy corresponded to the composition $V_{75.5}Ga_{12.7}Al_{11.8}+0.075$ $V_3B_2$. This alloy has a transition temperature $T_c$ of about 11.45° K. with $\Delta T_c=0.1°$. After tempering for 24 hours at about 800° C., the hollow cylinder showed in dependence on an external magnetic field H, the following critical current densities:

| H [kG] | 10 | 20 | 30 |
|---|---|---|---|
| $j_c$ [$10^3$ A/cm$^2$] | 83 | 50 | 45 |

After retempering for 166 hours at about 800° C. the critical current densities decreased to the following values:

| H [kG] | 10 | 20 | 30 | 40 | 50 |
|---|---|---|---|---|---|
| $j_c$ [$10^3$ A/cm$^2$] | 67 | 40 | 29 | 22 | 17 |

Comparison of the carbon or boron containing alloys with the alloy corresponding to Example 3 evidently shows increase of the critical current densities due to carbon or boron addition, compared to the alloy showing about the same vanadium-gallium and aluminum content.

We claim:

1. The method of preparing an alloy of the composition $V_xGa_yAl_z$ with $x+y+z=100$ and $68\leq x\leq 87$, $5\leq y\leq 31$ and $1\leq z\leq 22$, and situated within the heptagon given by the points $V_{68}Ga_{31}Al_1$, $V_{68}Ga_{10}Al_{22}$, $V_{76}Ga_6Al_{18}$, $V_{80}Ga_5Al_{15}$, $V_{84}Ga_6Al_{10}$, $V_{87}Ga_8Al_5$, $V_{87}Ga_{12}Al_1$, which comprises fusing the starting elements and cooling the alloy so obtained so rapidly to room temperature, that no conversion of the A2 into the A15 phase takes place, mechanically working the article so obtained into the required form, and then tempering at a temperature between 700° C. and that temperature at which conversion of the A2 phase into the A15 phase starts, until complete conversion into the A15 phase, or equilibrium between the A2 and A15 phase, is attained.

2. The method of claim 1, wherein the alloy obtained by fusing the starting elements is allowed to solidify non-directionally, and then is annealed for the purpose of homogenization at a temperature above the temperature at which conversion of the A2 phase into the A15 phase starts, and below the fusion temperature, and thereafter cooled down from the annealing temperature to room temperature.

3. The method of claim 1, wherein the fusion, annealing and tempering are carried out in an inert gas atmosphere.

4. The method of claim 2, wherein the annealing for the purpose of homogenization takes place at a temperature of about 1400° C., and continues for about 20 minutes.

5. The method of claim 1, wherein the cooling down from the fusion or annealing temperature takes place at a rate of about 1° per second to 10° per second.

6. The method of claim 1, wherein the tempering takes place at a temperature between 800° and 1000° C. and continues at least for about 20 hours.

7. The method of claim 6, wherein the alloy, after tempering at about 800° C., is heated for about 1 to 3 hours at about 1000° C.

8. The method of preparing an alloy of the composition $V_xGa_yAl_z$ with $x+y+z=100$ and $68\leq x\leq 87$;

$5\leq y\leq 31$ and $1\leq z\leq 22$, and situated within the nonagon given by the points $V_{68}Ga_{26}Al$, $V_{68}Ga_{10}Al_{22}$, $V_{76}Ga_6Al_{18}$, $V_{80}Ga_5Al_{15}$, $V_{84}Ga_6Al_{10}$, $V_{87}Ga_8Al_5$, $V_{87}Ga_{12}Al_1$, $V_{80}Ga_{19}Al_1$ and $V_{75}Ga_{19}Al_6$, which comprises fusing the starting elements and cooling the alloy so obtained so rapidly to room temperature, that no conversion of the A2 into the A15 phase takes place, mechanically working the article so obtained into the required form, and then tempering at a temperature between 700° C. and that temperature at which conversion of the A2 phase into the A15 phase starts, until complete conversion into the A15 phase, or equilibrium between the A2 and A15 phase, is attained.

9. The method of preparing an alloy of the composition $V_xGa_yAl_z$ with $x+y+z=100$ and $68\leq x\leq 87$;

$5\leq y\leq 31$ and $1\leq z\leq 22$, and situated within the hexagon given by the points $V_{80}Ga_{19}Al_1$, $V_{75}Ga_{19}Al_6$, $V_{74}Ga_{20}Al_6$, $V_{74}Ga_{12}Al_{14}$, $V_{82}Ga_{12}Al_6$ and $V_{82}Ga_{17}Al_1$, which comprises fusing the starting elements and cooling the alloy so obtained so rapidly to room temperature, that no conversion of the A2 into the A15 phase takes place, mechanically working the article so obtained into the required form, and then tempering at a temperature between 700° C. and that temperature at which conversion of the A2 phase into the A15 phase starts, until complete conversion into the A15 phase, or equilibrium between the A2 and A15 phase, is attained.

References Cited

UNITED STATES PATENTS 3,275,480 9/1966 Betterton et al. ______ 148—133
3,310,395 3/1967 Swartz et al. ________ 75—122.5

OTHER REFERENCES

Otto: Zeitschrift fur Physik, Band 218 Heft 1, Nov. 26, 1968, pp. 52–55.

CHARLES N. LOVELL, Primary Examiner

U.S. Cl. X.R.

148—11.5, 32